United States Patent
Sawhney et al.

(10) Patent No.: US 11,314,862 B2
(45) Date of Patent: Apr. 26, 2022

(54) METHOD FOR DETECTING MALICIOUS SCRIPTS THROUGH MODELING OF SCRIPT STRUCTURE

(71) Applicant: Tala Security, Inc., Fremont, CA (US)

(72) Inventors: Sanjay Sawhney, Cupertino, CA (US); Swapnil Bhalode, San Jose, CA (US); Andrew Joseph Davidson, Dallas, TX (US); Somesh Jha, Madison, WI (US); Vaibhav Rastogi, Madison, WI (US)

(73) Assignee: Tala Security, Inc., Fremont, CA (US)

( * ) Notice: Subject to any disclaimer, the term of this patent is extended or adjusted under 35 U.S.C. 154(b) by 216 days.

(21) Appl. No.: 15/953,953

(22) Filed: Apr. 16, 2018

(65) Prior Publication Data

US 2018/0300480 A1    Oct. 18, 2018

Related U.S. Application Data

(60) Provisional application No. 62/486,135, filed on Apr. 17, 2017.

(51) Int. Cl.
*G06F 21/00* (2013.01)
*G06F 21/56* (2013.01)
(Continued)

(52) U.S. Cl.
CPC ............ *G06F 21/56* (2013.01); *G06F 21/554* (2013.01); *G06F 21/563* (2013.01); *G06N 5/04* (2013.01);
(Continued)

(58) Field of Classification Search
CPC ........ G06F 11/00; G06F 15/18; G06F 21/563; G06F 17/30327; G06F 21/552;
(Continued)

(56) References Cited

U.S. PATENT DOCUMENTS 7,117,488 B1 * 10/2006 Franz ...................... G06F 21/50
717/144
7,203,963 B1 * 4/2007 Wu ........................ G06F 21/552
709/224

(Continued)

OTHER PUBLICATIONS

Curtsinger et al. "ZOZZLE: fast and precise in-browser JavaScript malware detection", SEC'11: Proceedings of the 20th USENIX conference on Security Aug. 2011; 16 Pages. (Year: 2011).*

(Continued)

*Primary Examiner* — Don G Zhao

(57) ABSTRACT

Disclosed herein are enhancements for operating a communication network to detect malware in scripts of web applications. In one implementation, a method for modeling the structure of embedded unclassified scripts to compare the abstract dynamism of similar scripts. The method may determine structure of unclassified end user browser script by building abstract structure using code from unclassified end user browser script; compare determined structure of unclassified end user browser script with a plurality of generalized abstract structures; if the determined structure of unclassified end user browser script matches within a predetermined threshold of any of the plurality of generalized abstract structures, then the unclassified end user browser script is classified as benign, otherwise the determined structure is classified as malicious. This, in turn, provides a scalable and efficient way of identifying benign, malicious, known and unknown scripts from a script available in full or in part.

20 Claims, 6 Drawing Sheets

(51) Int. Cl.
*G06N 5/04* (2006.01)
*G06F 21/55* (2013.01)
*G06N 20/00* (2019.01)

(52) U.S. Cl.
CPC ....... *G06N 20/00* (2019.01); *G06F 2221/033* (2013.01)

(58) Field of Classification Search
CPC .. G06F 21/554; G06F 21/56; G06F 2221/033; G06N 5/04; G06N 20/00
See application file for complete search history.

(56) References Cited

U.S. PATENT DOCUMENTS

| | | | | |
|---|---|---|---|---|
| 8,352,409 | B1* | 1/2013 | Satish | G06N 20/00 706/52 |
| 8,381,302 | B1* | 2/2013 | Kennedy | G06F 21/56 726/24 |
| 8,401,982 | B1* | 3/2013 | Satish | G06N 20/00 706/20 |
| 8,413,244 | B1* | 4/2013 | Nachenberg | G06F 21/565 726/23 |
| 8,418,249 | B1* | 4/2013 | Nucci | H04L 63/1416 726/23 |
| 8,713,679 | B2* | 4/2014 | Zorn | G06N 7/005 726/23 |
| 9,178,904 | B1* | 11/2015 | Gangadharan | G06F 21/53 |
| 9,516,051 | B1* | 12/2016 | Hu | H04L 63/1425 |
| 9,531,736 | B1* | 12/2016 | Torres | H04L 63/1441 |
| 9,690,933 | B1* | 6/2017 | Singh | G06N 5/045 |
| 9,825,976 | B1* | 11/2017 | Gomez | G06F 21/554 |
| 9,916,448 | B1* | 3/2018 | Zhang | G06F 21/564 |
| 9,942,264 | B1* | 4/2018 | Kennedy | H04L 63/145 |
| 10,216,933 | B1* | 2/2019 | Curtin | G06F 16/13 |
| 10,484,399 | B1* | 11/2019 | Curtin | H04L 63/1408 |
| 10,489,587 | B1* | 11/2019 | Kennedy | G06N 5/003 |
| 10,581,879 | B1* | 3/2020 | Paithane | G06F 21/566 |
| 10,860,719 | B1* | 12/2020 | Lukach | G06F 21/54 |
| 2006/0075468 | A1* | 4/2006 | Boney | H04L 63/1408 726/2 |
| 2007/0113282 | A1* | 5/2007 | Ross | G06F 21/566 726/22 |
| 2007/0152854 | A1* | 7/2007 | Copley | G06F 21/562 341/51 |
| 2007/0239993 | A1* | 10/2007 | Sokolsky | G06F 21/563 713/188 |
| 2007/0240215 | A1* | 10/2007 | Flores | G06F 21/55 726/24 |
| 2008/0263659 | A1* | 10/2008 | Alme | H04L 63/145 726/22 |
| 2009/0089759 | A1* | 4/2009 | Rajan | G06F 11/3604 717/126 |
| 2009/0265692 | A1* | 10/2009 | Godefroid | G06F 11/3688 717/128 |
| 2009/0300764 | A1* | 12/2009 | Freeman | G06F 21/55 726/24 |
| 2009/0327688 | A1* | 12/2009 | Li | G06F 21/566 713/100 |
| 2009/0328185 | A1* | 12/2009 | Berg | H04L 63/1416 726/13 |
| 2010/0031359 | A1* | 2/2010 | Alme | G06F 21/56 726/24 |
| 2010/0180344 | A1* | 7/2010 | Malyshev | G06F 21/53 726/23 |
| 2011/0030060 | A1* | 2/2011 | Kejriwal | H04L 63/1416 726/25 |
| 2011/0197177 | A1* | 8/2011 | Mony | G06F 8/51 717/115 |
| 2011/0231349 | A1* | 9/2011 | Stacy | G06N 5/047 706/12 |
| 2011/0239294 | A1* | 9/2011 | Kim | G06F 21/563 726/22 |
| 2012/0216280 | A1* | 8/2012 | Zorn | G06N 7/005 726/23 |
| 2014/0310222 | A1* | 10/2014 | Davlos | G06F 11/2294 706/46 |
| 2016/0173507 | A1* | 6/2016 | Avrahami | G06F 21/563 726/23 |
| 2016/0212153 | A1* | 7/2016 | Livshits | G06F 21/563 |
| 2016/0253500 | A1* | 9/2016 | Alme | G06F 21/552 726/23 |
| 2016/0337387 | A1* | 11/2016 | Hu | G06F 16/2246 |
| 2017/0195356 | A1* | 7/2017 | Turgeman | G06F 21/552 |
| 2018/0103047 | A1* | 4/2018 | Turgeman | H04L 63/08 |
| 2018/0124109 | A1* | 5/2018 | Hunt | H04L 63/1483 |

OTHER PUBLICATIONS

Kapravelos, et al. "Revolver: An Automated Approach to the Detection of Evasive Web-based Malware," published in 22nd USENIX Security Symposium, Aug. 14-16, 2013. pp. 636-651; 16 pages. (Year: 2013).*

Berkhin, Pavel "Survey Of Clustering Data Mining Techniques", Grouping Multidimensional Data: Recent Advances in Clustering, 2002, p. 25-71.

Wang et al. "Constructing format-preserving printing from syntax-directed definitions", Science China Information Sciences, Nov. 2015, vol. 58, p. 1-14.

Pawlik et al. "Tree edit distance: Robust and memory-efficient", Information Systems, 2016, vol. 56, p. 157-173.

Pan et al. "CSPAutoGen: Black-box Enforcement of Content Security Policy Upon Real-world Websites", In Proceedings of the 2016 ACM SIGSAC Conference on Computer and Communications Security (CCS '16), ACM, Oct. 2016, p. 653-665.

* cited by examiner

METHOD FOR DETECTING MALICIOUS SCRIPTS THROUGH MODELING OF SCRIPT STRUCTURE

RELATED APPLICATIONS

This application claims the benefit of and priority to, U.S. Provisional Patent Application No. 62/486,135, filed on Apr. 17, 2017, and entitled "Method for Automatic Modeling of Script Structure," which is hereby incorporated by reference in their entirety.

TECHNICAL BACKGROUND

Scripts are an integral component of modern documents, software applications, web pages within a web browser, usage of the shells of operating systems (OS), embedded systems, as well as games, providing unparalleled flexibility and dynamism (e.g. an online banking website might use a script to obtain credentials and transaction information from the user). The spectrum of scripting languages ranges from very small and highly domain-specific languages to general-purpose programming languages used for scripting. Standard examples of scripting languages for specific environments include: Bash, ECMAScript (JavaScript), VBScript, PHP, PowerShell, Visual Basic, Lua, Linden Scripting Language and TrainzScript. Scripts provide important functionality, but also have security ramifications and can lead to various attacks.

Modern web applications and documents, such as pdf, docx, xlsx, html etc. contain both snippets of code (in the form of scripts and macros) and data. Modern enterprise web application architectures (e.g., Angular JS, Ember JS) perform more of the processing, store more of the intelligence and data on client devices. Along with this architectural shift, the application threat landscape has also shifted towards client-side attacks such as web injection attacks from malware, cross-site scripting (XSS), and document object model (DOM) based attacks and others. Such "client-side" attacks result in fraud, malicious ads, lower return on investment (ROI) on ad spend, loss of sensitive customer and app data, and customer dissatisfaction.

Malware includes computer code (e.g., a software application, a utility, or other code) that can interfere with an end user device's normal functioning. Script-based malware includes script code that can infect a computing end user device and cause the computing end user device to malfunction. Examples of script code that can be used to generate script-based malware include JavaScript, Visual Basic Script (VBScript), and so on.

In an example scenario, a user navigates to a website that includes script-based malware. The script code of the script-based malware is then loaded onto the user's computing end user device, e.g., as part of the website code. A script engine on the computing device then parses the script code and the parsed script code is compiled and executed on the computing end user device. Execution of the script code can cause a variety of undesirable activities on the computing end user device, such as the slowing and/or malfunctioning of applications running on the computing end user device. This could also be in the form of additional form fields to a login page that is designed to pass user credentials to some external address controlled by the malware, therein stealing the user's credentials and/or authorization codes to use at a later point in time (e.g. cross-site request forgery, clickjacking, crypto-jacking, etc.).

In practice, the sheer number, variance, and dynamism of scripts makes the process of whitelisting scripts very hard. Traditional network-based or server-based security products such as Web Application Firewalls (WAFs) or Run-Time App Self Protection (RASP) etc., have no visibility into the users and their devices that connect to the application. In addition, these products use signatures and are powerless against zero-day vulnerabilities. The sheer number and the proliferation of these scripts make it extremely difficult to manage and distinguish between benign and malicious scripts. Therefore, there exists a need to safeguarding against end user script-based attacks. Ideally such a solution is done without agents installed on end user devices and is efficient despite the sheer volume of scripts.

SUMMARY

The present disclosure describes a method for automatically categorizing a script, available either in full or part in a language such as Javascript, into one or more abstractions available in a reference database, built previously from a corpus. These abstractions group similar scripts and therefore can be used to provide a scalable solution for fast matching and categorization of a given script either in real time or offline. This, in turn, enables the ability to whitelist legitimate scripts, weed out non-matching scripts, and infer false positives and true attacks from raw events.

This disclosure outlines an automated approach for accurately modeling the structure of embedded scripts using language based and machine learning based techniques to abstract the dynamism of similar scripts. This, in turn, provides a scalable and efficient way of identifying benign, malicious, known and unknown scripts from a script available in full or in part. This disclosure outlines the ability to infer the structure of scripts and then use that in detection, protection, and remediation in a variety of applications in the context of information security.

In one implementation, a method may determine a structure of an unclassified end user browser script by building an abstract structure using code from unclassified end user browser script; comparing the determined structure of the unclassified end user browser script with a plurality of generalized abstract structures; if the determined structure of the unclassified end user browser script matches within a predetermined threshold of any of the plurality of generalized abstract structures, then the unclassified end user browser script is classified as benign, otherwise the determined structure is classified as malicious.

In another implementation, a method includes: receiving a plurality of benign web content, each web content having a script; extracting the scripts from each of the plurality of benign web content; extracting structural features from the scripts; building a plurality of abstract syntax trees (ASTs) using the structural features of the scripts; clustering the plurality of ASTs into common clusters of ASTs by means of a predetermined tree edit distance; and generalizing the common clusters of ASTs into a plurality of generalized ASTs (GASTs) by means of associating a common node that is predictive of a particular type of script.

In another implementation, a method includes: determining structure of unclassified end user browser script by building abstract syntax tree (AST) using code from unclassified end user browser script; compare determined structure of unclassified end user browser script with a plurality of generalized ASTs, the plurality of generalized ASTs determined by: a plurality of abstract syntax trees (ASTs) from a plurality of known benign script codes, wherein building an AST includes extracting a structural feature from a first portion of known benign script code; clustering the plurality of ASTs into common clusters of ASTs by means of a predetermined tree edit distance; and generalizing the common clusters of ASTs into a plurality of generalized ASTs (GASTs) by means of associating a common node that is predictive of a particular type of script.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DESCRIPTION

A script is any program written in a scripting language (a language to automate or execute tasks in a runtime environment). Usually scripts are interpreted but can be compiled. Scripting languages can be domain specific or general purpose. Examples of scripting languages are ECMAscript (JavaScript), Perl, VBScript, Python, Lua, Applescript, ActionScript etc. Scripts provide important functionality, but also have security ramifications and can lead to various attacks. Therefore, one of the keys to safeguarding against script-based attacks is the ability to infer the structure of scripts and then use that in detection, protection, and remediation in a variety of applications in the context of information security. It is a well-established fact that scripts are a security issue on the client side. Whitelisting scripts or small snippets of code embedded in various documents (html, pdf, docx, xlsx) is one way of providing a secure environment outside of the back-end servers.

Previously, the problem of the volume and proliferation of scripts has been looked at purely from a language-based lens by leveraging parsers to build Abstract Syntax trees (ASTs) of scripts and looking for other scripts with the exact same ASTs. These approaches fail in 3 areas: 1) when insufficient script samples are available, the chances of missing true positives are extremely high because of an overly rigid AST structure, 2) they do not have an explicit subtyping relationship (This means that the type inferencing steps are not precise and for several value fields the inferred types are not very precise), and 3) inability to identify likely matching ASTs when a script source is available only in part (such as the first 40 characters of a script).

The technical effect of this disclosure is to: 1) automatically determine the n possible structures that a script conforms to; 2) use a combination of parser and machine-learning techniques; 3) refine the results of step 1 with the availability of additional scripts; and 4) use the automatically derived script structures of webpages and documents for threat detection, prevention, mitigation, prediction and response. Specifically, this approach produces high-quality results that can be leveraged in: whitelisting benign scripts, detecting malicious scripts, and classifying security events into false positives and true positives (e.g. real attacks). The malware policy requires no changes to a web application or user device and is agent-less protection. Examples disclosed herein provide enhancements for configuring web applications of an origin server or content provider in a communication network with a malware policy according to an implementation. The disclosure, in an embodiment, uniquely monitors the user environment providing comprehensive understanding and analytics of how users are being attacked.

Figure 1:
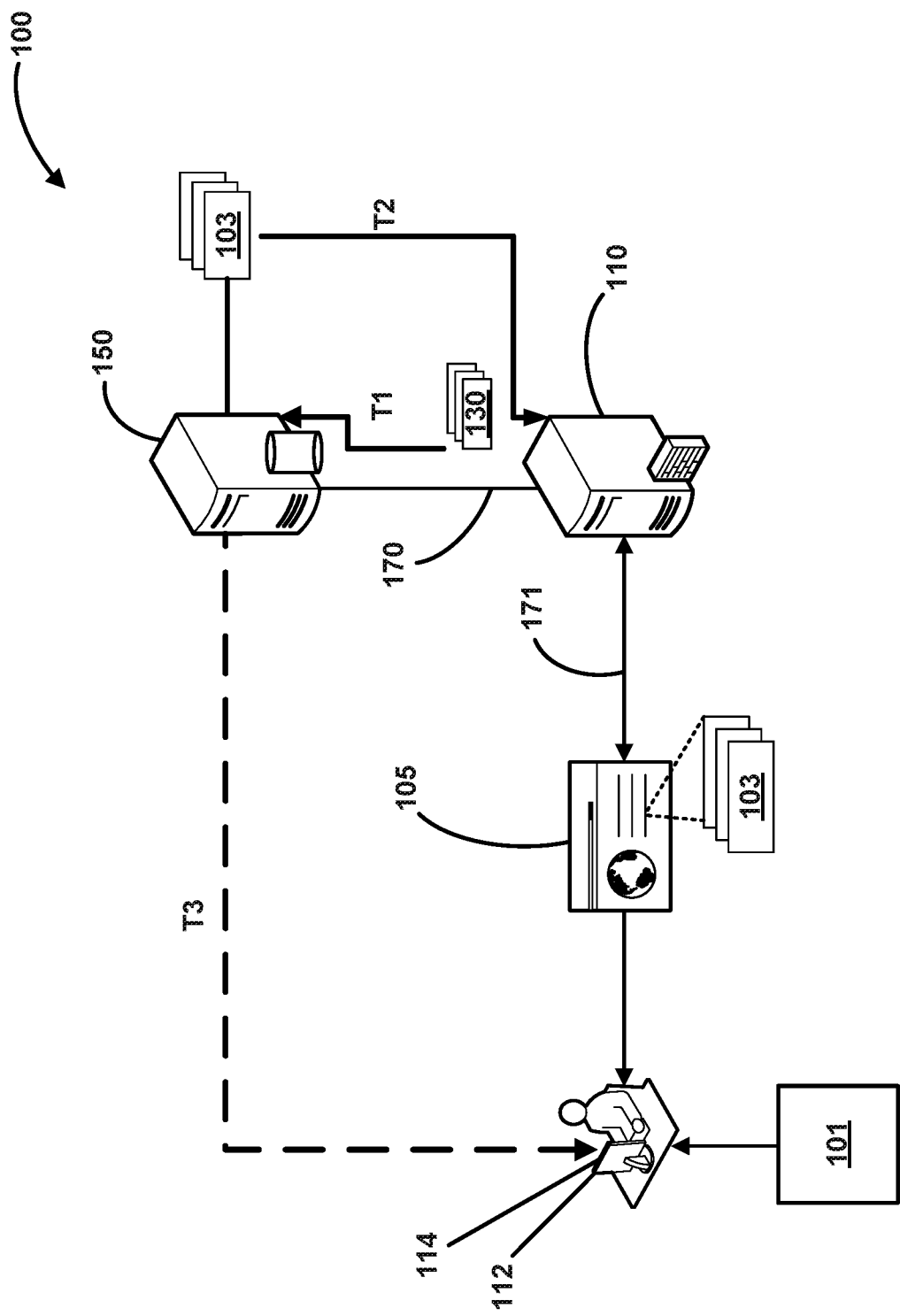
FIG. 1 illustrates a communication system for detection of script-based malware according to an implementation.

FIG. 1 illustrates a communication network 100 to produce and implement a malware policy in a web application according to an implementation. Communication network 100 includes a server 110, end user device 114, a browser 112, malware 101, and a management system 150. Server 110 communicates with end user devices 114 and management system 150 via communication links 170-171. Server 110 can include a variety of different devices and entities from which web content can be retrieved, such as a cache node, a local server (e.g., a LAN server), an origin server, back end server, a content provider server, an application server, a network resource, a cloud computing resource, and so on. Server 110 communicates with end user devices 114 and management system 150 via communication links 170-171.

Figure 6:
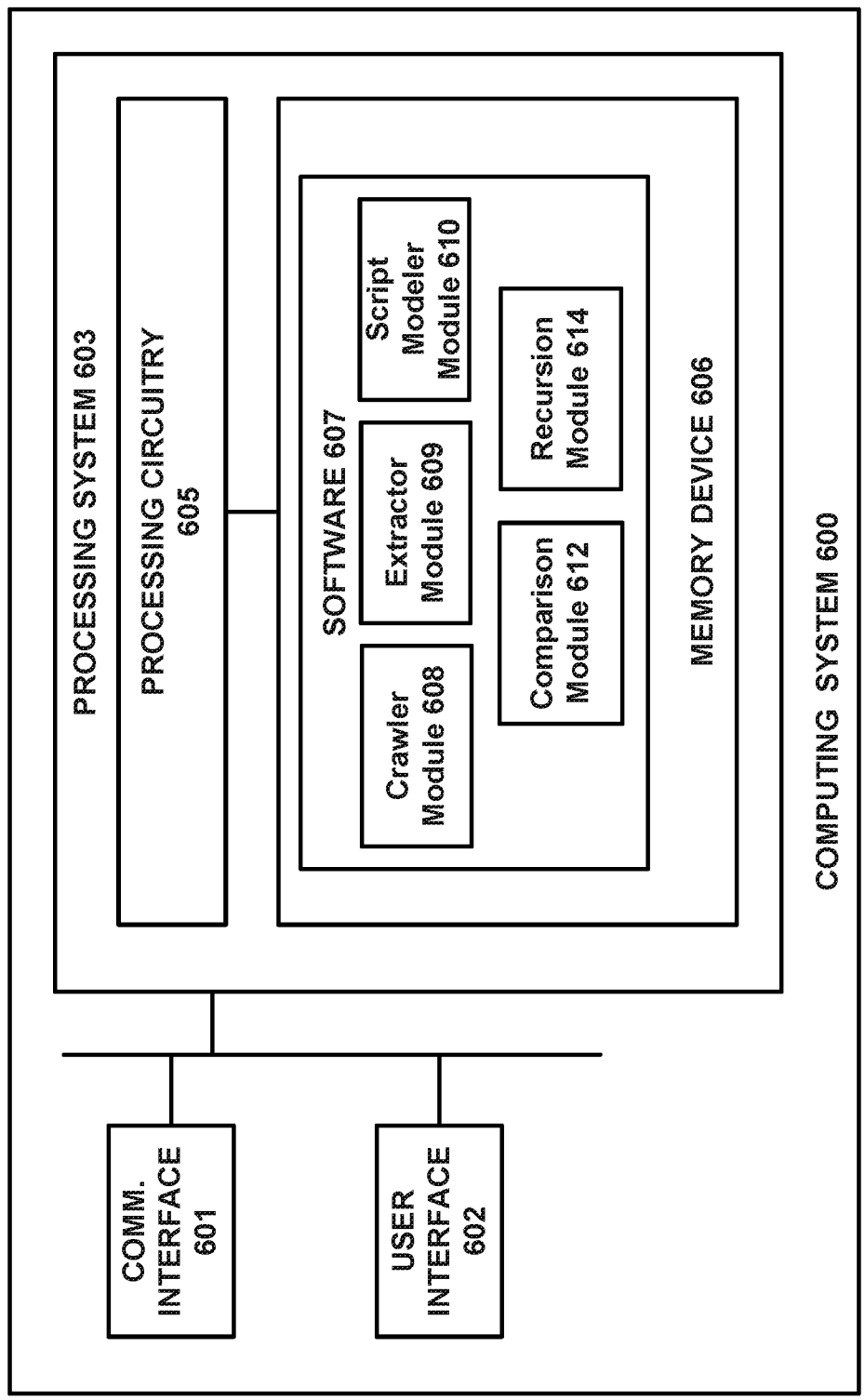
FIG. 6 illustrates a management computing system for configuring malware policies of a web application according to an implementation.

Server 110 and management system 150 can each include communication interfaces, network interfaces, processing systems, computer systems, microprocessors, storage systems, storage media, or some other processing devices or software systems, and can be distributed among multiple devices (FIG. 6). Examples of servers 110 and management system 150 can include software such as an operating system, logs, databases, utilities, drivers, caching software, networking software, and other software stored on a computer-readable medium. Servers 110 and management system 150 may each comprise, in some examples, one or more server computing systems, desktop computing systems, laptop computing systems, or any other computing system, including combinations thereof.

End user devices 114 can each be a user device, subscriber equipment, customer equipment, access terminal, smartphone, personal digital assistant (PDA), computer, tablet computing device, e-book, Internet appliance, media player, game console, or some other user communication apparatus, including combinations thereof. End user devices 114 can each include communication interfaces, network interfaces, processing systems, computer systems, microprocessors, storage systems, storage media, or some other processing devices or software systems (FIG. 6).

Communication links 170-172 each use metal, glass, optical, air, space, or some other material as the transport media. Communication links 170-172 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-172 can each be a direct link or can include intermediate networks, systems, servers, or devices, and can include a logical network link transported over multiple physical links. Although one main link for each of links 170-176 is shown in FIG. 1, it should be understood that links 170-172 are merely illustrative to show communication modes or access pathways. In other examples, further links can be shown, with portions of the further links shared and used for different communication sessions or different content types, among other configurations. Communication links 170-172 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Malware 101 may be understood to include a variety of forms of hostile, malicious, or intrusive software, including computer viruses, worms, trojans, ransomware, spyware, adware, scareware, and other intentionally harmful programs. Malware 101 may be injected into a web application 105, e.g. a, a web page, the application 105 having some portion of script code, e.g. JavaScript being run on a user's browser 112 on an end user device 114. Malware 101 on an infected device 114 may be totally invisible for a user, by tampering with both HTTP requests sent by a user's web browser 112 and responses received from the server 110.

Malware 101 web injection is used by an attacker to introduce (or "inject") code into a vulnerable computer program (e.g. browser 112) and change the course of execution. In particular, cross site scripting (XSS) attacks are a type of injection, in which malicious scripts 101 are injected into otherwise benign and trusted websites 105. XSS attacks may be a piece of HTML or JavaScript code, which is added by malware 101 to the website 105 when a browser 112 opens it. This may be in the form of additional form fields added to the login page or JavaScript code designed to pass user credentials to some external address controlled by malware operator. XSS attacks may occur when an attacker uses a web application to send malicious code 101, generally in the form of a browser side script, to a different end user. Flaws that allow these attacks to succeed occur anywhere a web application uses input from a user device 114 within the output it generates without validating or encoding it. An attacker can use XSS to send a malicious script 101 to an unsuspecting user device 114. The end user's browser 112 has no way to know that the malicious script 101 should not be trusted and will execute the malicious script 101. Because it thinks the script came from a trusted source, the malicious script 101 can access any cookies, session tokens, or other sensitive information retained by the browser 112 and used with that site 105. These malicious scripts 101 can even rewrite the content of the HTML page.

In another example, document object model (DOM) based attacks DOM Based XSS or "type-0 XSS" is an XSS attack wherein the attack payload is executed as a result of modifying the DOM "environment" in the end user's browser 112 used by the original client side script, so that the client side script code runs in an "unexpected" manner. That is, the page 105 itself (the HTTP response that is) does not change, but the client-side code contained in the page 105 executes differently due to the malicious modifications that have occurred in the DOM environment.

In operation, end user devices 114 generate requests for network content from server 110, such as Internet web pages or media content 105 such as videos, documents, pictures, and music. Upon receipt of a request, the server 110 processes the requests and supplies (get function) the required content, e.g. web application 105 to the requesting device 114. The end user browser 112 compiles and runs the web application 105 on the end user device 114.

The web application 105 may include a content security or anti-malware policy 103 developed by the management system 150 and transmitted to the server 110 to be transmitted and compiled and run on client end user side. In the present implementation, the web application 105 is configured or embedded with a malware policy 103, which represent malware detection capable of comparing benign scripts with unclassified scripts. The policy 103 may be specific to a content provider or may work for various content providers. In the context of script-based malware, the policy 103 can interact with the end user web browser 112 and/or a script engine 135 to inspect script code that is received from the server 110 and determine if the script code is associated with malware or benign (FIG. 7).

Often, script code that is written as part of web content 105 is subjected to obfuscation to hide all or part of the actual script code. The web browser 112 will de-obfuscate the scripts at which point the malware policy 103 will initially instantize. Should the script dynamically call to resource objections or further scripts, the policy 103 may re-instantize at that time. Management system 150 is configured to provide operation 200, which is further described in FIGS. 2-3.

Figure 2:
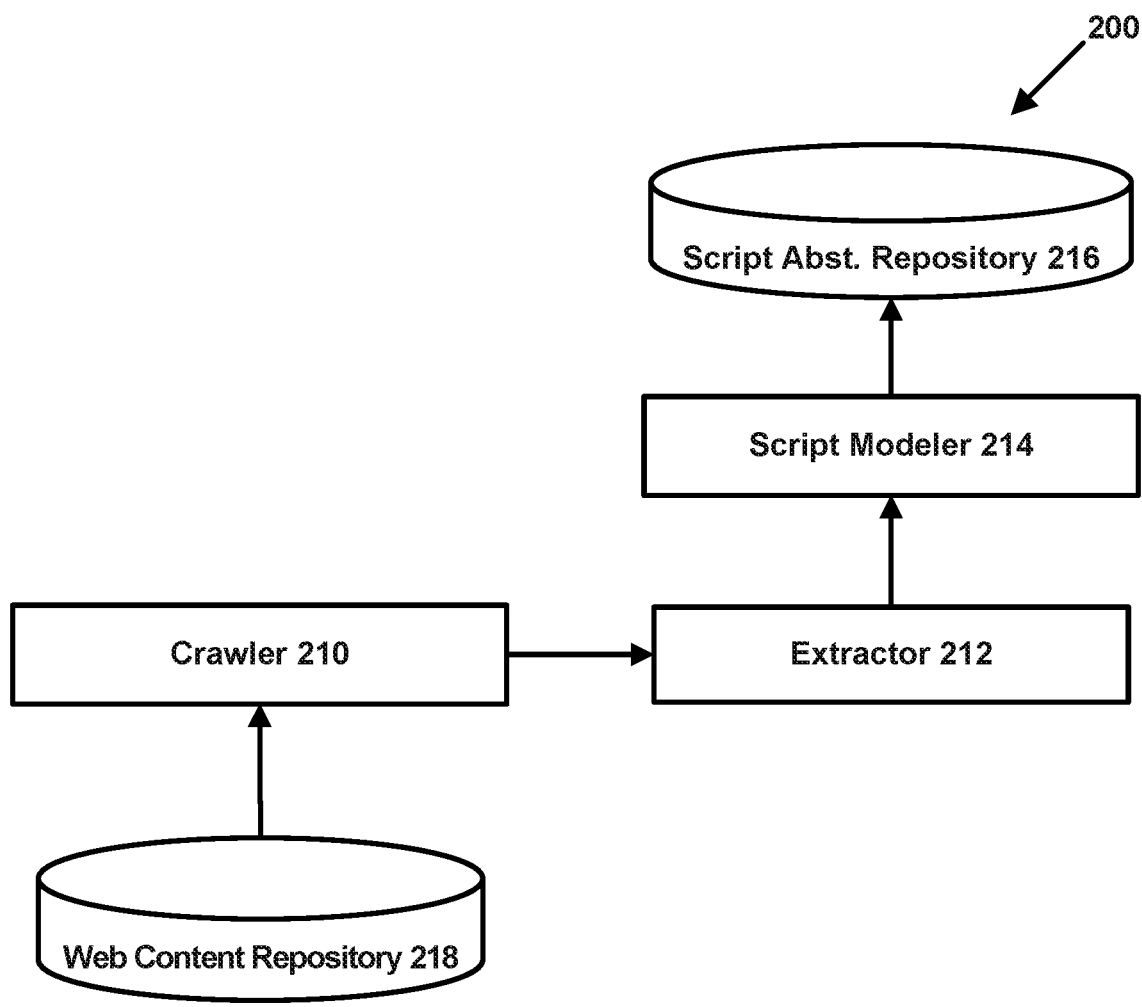
FIG. 2 illustrates an example process for iteratively modeling scripts from a corpus of script samples.

FIG. 2 illustrates an operation 200 of a management system to configure servers of a communication network 100, in particular, building a corpus repository of scripts to be utilized by a policy 103 configured for web applications according to an implementation. The processes of operation 200 are referenced parenthetically in the paragraphs that follow with reference to systems and elements of communication network 100 of FIG. 1.

As described herein, management system 150 in a communication network 100 employ a module, such as a crawler 210, an extractor 212, a script modeler 214, and memory such as a script repository or script abstraction database 216 and other similar configurations to provide an anti-malware policy 103 to requesting content providers 110 and eventually to end user devices 114. Each content service provider 110 may be provided with its own anti malware policy 103 that provides the anti-malware operations that may be specific to its service. The specificity is dependent upon the web content repository 218. If the web content repository 218 is web applications that are specific to the content provider 110, then the solution or policy 103 will be specific to the content provider 110. If the web content repository 218 is not specific, but the entire web or smaller subset, e.g. Javascript, documents, then the policy 103 will be broadly defined. It is envisioned in this disclosure that the entire web may be scrubbed and filtered down to create a corpus by the process disclosed herein. The corpus being saved in the script repository 216. The script repository 216 being utilized or copied by the server 110 whenever policy 103 is instantized. It is foreseen that the policy may be run by the management system 150 or in a cloud as the analysis does not perform penetration testing or vulnerability analysis, but to determine what the legitimate behaviors of the web app are or would be if allowed to run (T3).

Once all scripts from any source are crawled through by the crawler 210, then the scripts are extracted from the web applications 105 by an extractor 212. It is foreseen that a crawler or scanner 210 may not be necessary, and that the policy 103 may be developed alongside development of the web application, e.g. in the production continuous integration/continuous delivery (CI/CD) cycle of the web applications or pre-production. The extracted scripts are then modeled by the script modeler 214 and stored in the script repository 216 as will be further discussed below.

Figure 3:
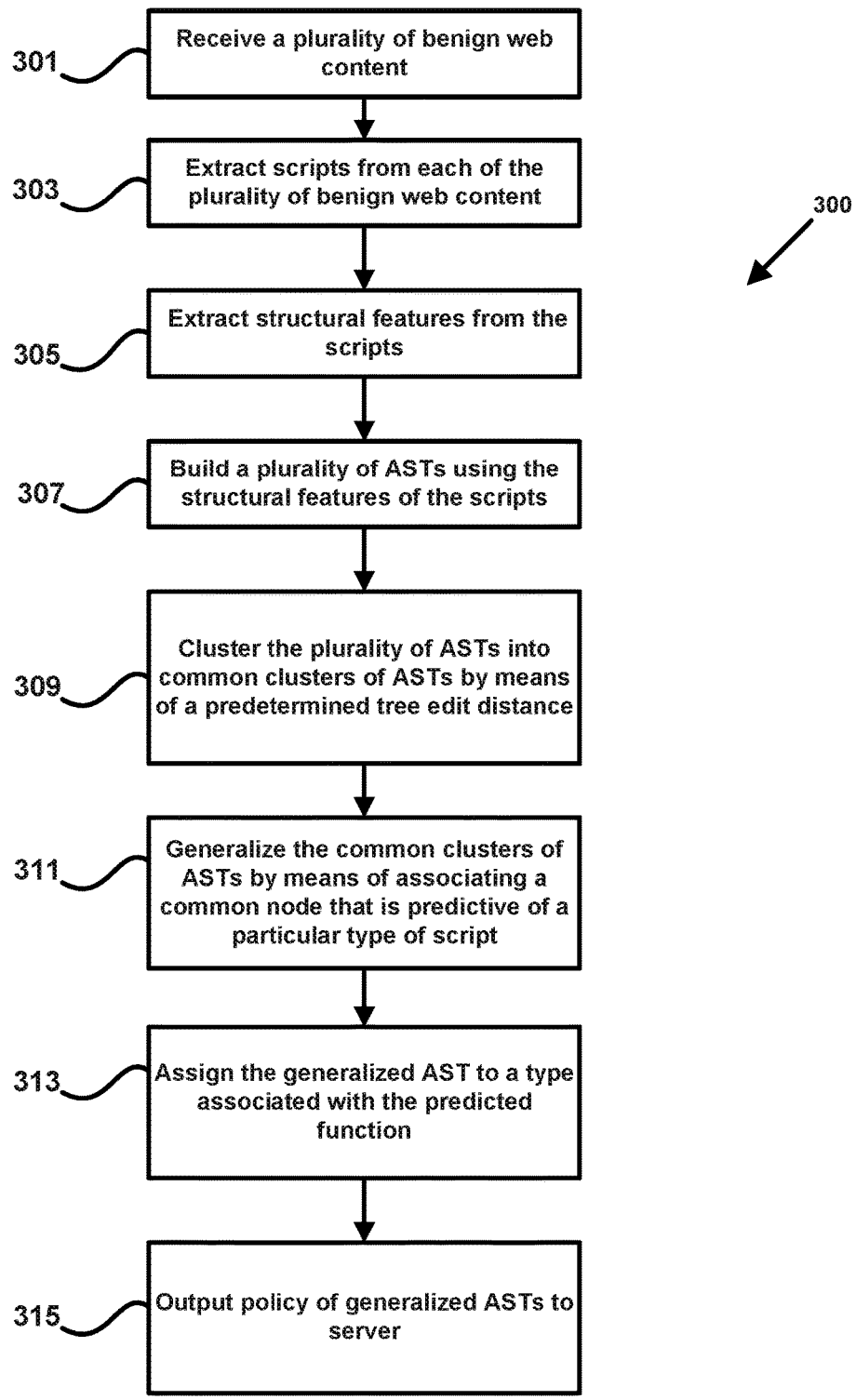
FIG. 3 illustrates an example process of a management system to configure malware policy of a web application according to an implementation.

Referring now to FIG. 3, to deploy a policy 103 to the server 110 of the communication network, operation 200 includes receiving (301) a plurality of benign web content 130 (T1). In one example, an administrator for a particular service provider 110 may transmit to the management system 150 all benign web content 130 utilized by that service provider 110. This would make a specific policy 103 to that service provider 110. In another example, a crawler or scanner 210 may be instantzed to crawl through the web and collect web applications 130 to create a corpus of benign web applications 130 of which the modeling algorithm of the modeler 214 may be applied. The scanner 210 can record scripts or fragments of script code that will be generated as part of a script unfolding or de-obfuscating in the end user browser 112. It is foreseen that this step may also be some combination of the two (modeling specific and having a corpus already), as the corpus increases, it may be advantageous to utilize the corpus with a specific subset of scripts utilized from a service provider 110.

Each of the received web content 105 generates a script or application using C, C++, Java, or some other similar programming language. Once the web content is received by management system 150, management system 150 may extract (303) the individual scripts from each of the plurality of benign web content.

Figure 4:
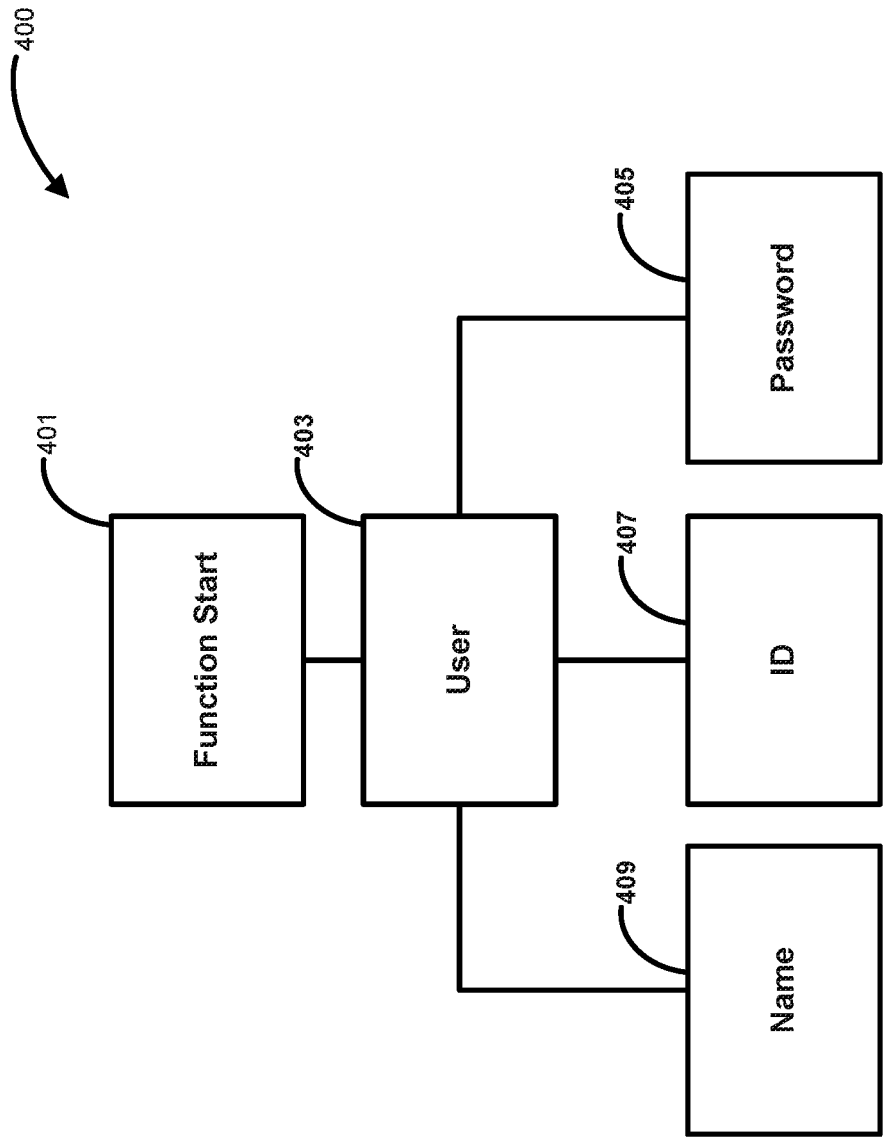
FIG. 4 illustrates an example of abstract syntax tree (AST) structural feature extraction in accordance with one or more implementations.

Once the scripts are extracted from the web content or web application 105, then the structural features of the scripts are extracted (305). For example, a parser or extractor 212 may parse the benign script code received to extract structural features (e.g. 403) from the script code. The parsed script code can then be used by the script modeler 214 to build (307) a plurality of abstract syntax trees (ASTs), parsing trees, derivation trees, or a concrete syntax tree (FIG. 4). An AST is an internal data structure built by a parser after performing syntactic analysis of a script or a program. ASTs have a lot more structure than the texts of the scripts because they capture the "structure" of the script. ASTs could also be derived from portions or part of the scripts (e.g. first 40 characters of a script or a particular function call).

Once the plurality of ASTs (e.g. set of T $\{t_1, t_2, t_3, \ldots, t_n\}$) are built, then the modeler 214 will cluster (309) the ASTs into common clusters. These clusters may be accomplished by algorithms such as: hierarchical; partitioning (e.g. k-means, k-medoids, probabilistic, etc.); grid-based; co-occurrence of data; constraint based; machine learning; scalable; subspace; projection; and co-clustering.

In one example, this is done by the metric of a tree edit distance. The tree edit distance between ordered labeled ASTs is the minimal-cost sequence of node edit operations that transforms one tree into another. There may be three edit operations on labeled ordered trees: delete a node (e.g. 403) and connect its children to its parent maintaining the order; insert a node between an existing node and a subsequence of consecutive children of this node; and rename the label of a node (see FIG. 4). A cost is assigned to each edit operation, then, the cost of an edit sequence is the sum of the costs of its edit operations. A tree edit distance is the sequence with the minimal cost. A single-path function computes the tree edit distance between two relevant subtrees according to the chosen path. A predetermined tree edit distance (d) is a value for the threshold of comparison of one tree to another. The larger d is, the looser the match with a given tree.

The tree edit distance d decomposes the trees into subtrees and subforests (e.g. clusters). The distance between two forests is computed in constant time from the solution of smaller subproblems. At each recursive step there are two ways in which the forests can be decomposed into smaller problems: either by deleting the leftmost or the rightmost root node of the forests. The distance between two forests is the minimum distance of four smaller problems. The costs of the edit operations are added to the corresponding problems. The subproblems that occur during the computation of the tree edit distance are called relevant subproblems. Their number, which describes also the time complexity, depends on the choice between left and right solution at each recursive step. Algorithms (e.g. Tai, Zhang and Shasha, and Klein) use a so-called decomposition strategy to determine the choice of left vs. right at each recursive step. One clusters a tree $t_2$ in with a common $t_1$ if a predetermined tree distance is calculated between trees $t_1$ and $t_2$. Intuitively trees that are closer according to the distance metric d are "more" similar and are clustered together as a common cluster. For example, $d(t_1, t_2) < d(t_3, t_2)$ means that $t_2$ is more similar to $t_1$ than $t_3$. It is foreseen that hierarchical clustering is advantageous over other clustering algorithms, such as k-means, as that it does not apriori require the number of clusters.

The output of step 309 is a set of clusters, e.g. C $\{c_1, c_2, c_3, \ldots, c_n\}$, where each cluster (e.g. $c_1$) is a set of common ASTs. Next at step 311, model a generalized structure for each cluster, such that the set of common ASTs become a generalized AST (GAST). Each cluster intuitively corresponds to a functionality (e.g., as the example above GAST 400, wherein each cluster corresponds to the log-in script corresponding to individuals). But these scripts will have data corresponding to the individual (e.g. individuals account number). The process 300 "abstracts away" this specific information. For example, account number might be replaced by its type (4-digit number). GAST corresponds to abstraction of each AST in the cluster. So, each cluster will become a GAST.

FIG. 4 illustrates an example GAST generally at 400. Where node 403 represents the class user, node 405 represents the password being 6 characters long, node 407 represents the user's ID, and node 409 represents the string name. While the GAST 400 illustrated is discussed with respect to script code, this is not intended to be limiting. For example, the structural feature extraction scenario 300 can be used to extract structural features from a variety of different types of code (examples of which are listed above). The GAST 400 includes various aspects that can be used to characterize the structure as being associated with a log-in function 401.

For an example, suppose at node 407 in the ASTs in a cluster has values {2345, 6789, 9788, 9090} at AST node 407. In the context of an online banking website, these values probably correspond to individuals account numbers or ID. The process will assign a type of "account-number" or "ID" to that node 407 along with a specification of this type (e.g., an integer with 4 digits). Now the plurality of ASTs in that cluster becomes a GAST (311) and will match any script that has a 4-digit value in that node. The process will generalize each node that corresponds to the values that might appear in the nodes of the ASTs corresponding to scripts, e.g. node 409 is assigned name and node 405 is assigned to password. The type system may have a sub-type relation (e.g., account-number<int, because an account-number is also an integer, albeit of a special form). The process infers a most specific type t given a set of values $\{v_1, \ldots, v_k\}$ according to the sub-typing relation. For example, for the set of values {2345, 6789, 9788, 9090} are inferred to be the type "account-number," and not an integer (int) or floating point.

Lastly, the modeler 214 will infer the functionality of the plurality of GASTs $\{g_1, \ldots, g_k\}$. As the example above, wherein a user has a password, ID, and user name, this will be inferred to be a log in function. Once the modeler 214 infers the functionality the GASTs will be assigned the predicted function as a type (313). The modeler 214 can infer the functionality based on: the type of website, e.g. banking, auction, retailer, etc.; the web designer template; and the web application framework or platform (e.g. Angular, Java, Flash, Silverlight, etc.). As the modeler 214 builds a larger and larger corpus of scripts and GASTs, the modeler can machine learn based on false positives, and can change the inferences on the fly to better the GAST.

As an example, let the GAST $g_1$ correspond to a user entering a transaction in an online banking website. The $g_1$ may contain various paths with various structures of the transaction (e.g., obtaining the user credentials, or a user providing the transaction type). This step requires inference from the modeler 214. Such inferences may also be from metadata or knowledge base of the underlying web framework or document container in which the script was generated. Lastly, the generalized ASTs are sent to server 110 as a policy 103 (T2).

Figure 5:
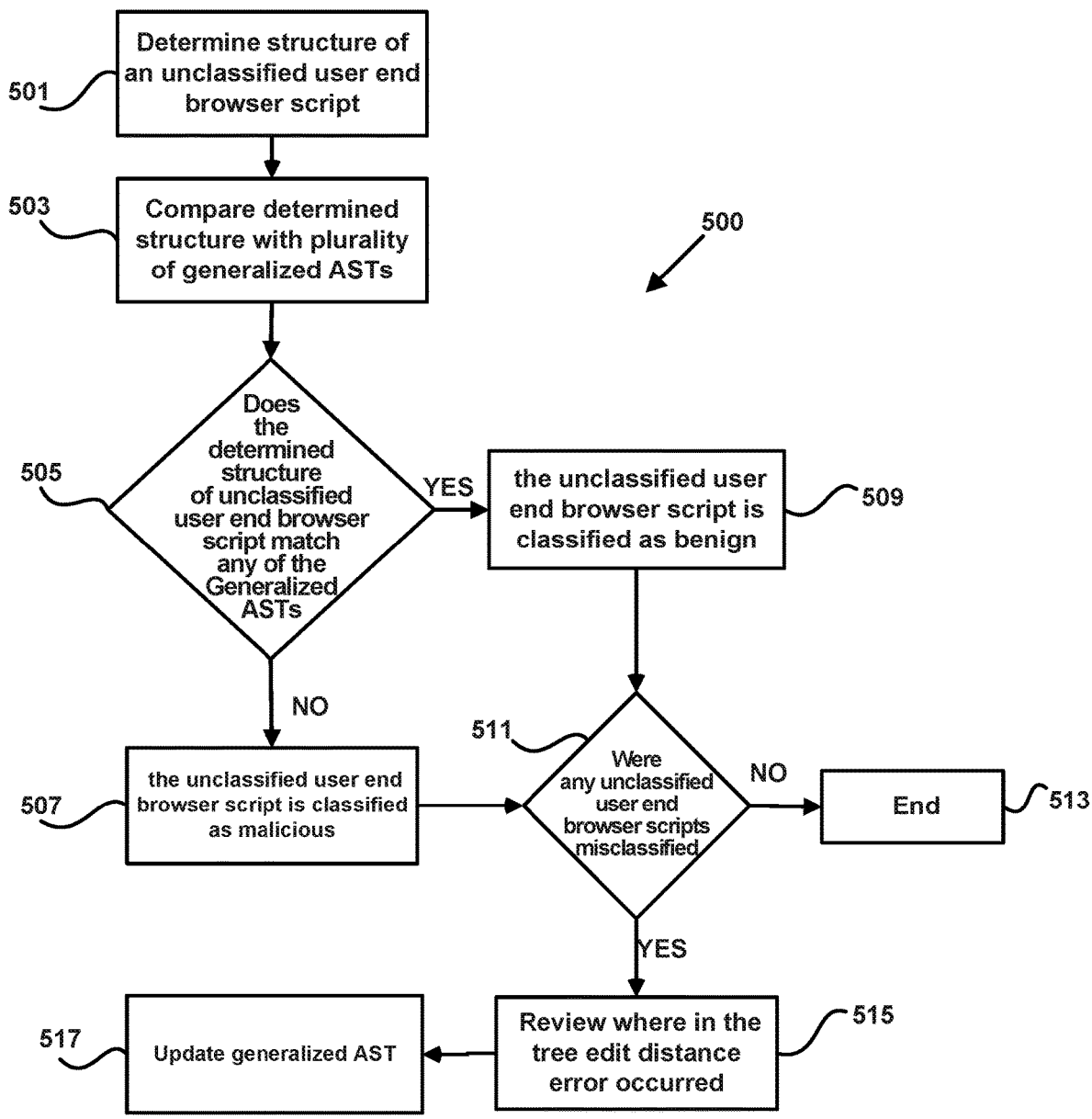
FIG. 5 is a flow diagram depicting an example process for detecting script-based malware in accordance with one or more implementations.

Referring now to FIG. 5, in some implementations, in interacting with the server 110, the browser 112 may use an application programming interface (API) to communicate with the server 110. These API commands may include commands such as PUT (PRINT), GET_REQUEST, SEND_RESPONSE, and other similar commands to provide the desired operation. Accordingly, when content 105 is to be processed by the policy 103, the browser 112 may use a first command to obtain the data (from the local cache node 110), process the data in accordance with the web application requested, and provide the processed content to the desired end user browser.

Once the web application 105 is received at the end user browser 112, the browser will compile or interpret the script portion of the web application 105 into web assembly code, or WebAssembly code, wherein the operations of the application 105 may be translated from the first language to the WebAssembly language. This WebAssembly code is a standard that defines a binary format and a corresponding assembly-like text format for executable code in Web pages. Either before, after, or during, the policy 103 will determine the structure of the script in order to classify the application 105 as benign or malicious. Some web applications 105 are dynamic and call for them to be run over and over and the policy 103 may check every instance of the web application 105 that is run or just the initial. It is also foreseen that the policy 103 may only review some portion (e.g. the first) of the script to determine the script structure. This may be the case, for instance, where the script has been obfuscated and in the process of being de-obfuscated at the browser 112. In some implementations, a process 500 for detecting script-based malware may be utilized. At step 501, the policy 103 will determine the structure of the unclassified script being loaded on the end user browser 112. This may be accomplished by the extractor 212.

Once the structure of the script has been determined and an AST created, in step 503, the policy 103 will compare the determined structure of the unclassified end user browser 112 with the plurality of generalized ASTs (determined in step 311 above). It should be understood that the policy 103 may be utilizing at least one of the management system 150 and the server 110 for processing the comparison as will be further discussed below. At step 505, the determined structure of the unclassified script will be determined if it is a match with the plurality or set of generalized ASTs. A match may be a predetermined tree edit distance or some threshold of a predetermined tree edit distance. If there is a match within the predetermined tree edit distance, then the script is classified as benign (509). Otherwise, the script is classified as malicious (507). The policy 103 can be configured in detection or blocking mode—in detection mode, the policy 103 will not block the behavior and send an alert or notification to the management system 150 and/or the server 110. If any portion of the web application 105 does not meet the constraints, then an alert may be provided to the administrator of the server 110 indicating the issue with the web application. In blocking mode, the policy 103 will both block the malicious behavior and alert the management system 150. In contrast, if the application 105 does meet the constraints, then the application in the web assembly code may be recompiled or finish compiling to be run on the end user browser 112.

With such a strict black or white, meet or not threshold, policy 103, there are bound to be false positives/negatives or misclassifications on the malicious side, though the benign side is a possibility too. As such the policy 103 will learn or train from the false positives. The server 110 once notification is received may allow the web application 105 to run, therein creating an exception to the policy 103 as a script was misclassified (511). Instead of or in combination with allocating for an exception, the policy 103 will review (515) the false positive, and in particular the tree edit distance, otherwise the process 500 ends (513). It is foreseen that other algorithms may be used to compare to the first algorithm used to get to a result that does not tend towards a false positive. Once the training or machine learning is accomplished the updated generalized AST replaces previous GAST (517) to limit miscalculations in future comparisons.

FIG. 6 illustrates a management computing system 600 for a communication network 100 according to an implementation. Management computing system 600 is representative of any computing system or systems with which the various operational architectures, processes, scenarios, and sequences disclosed herein for a management system may be implemented. Management computing system 600 is an example of management system 150 of FIG. 1, although other examples may exist. Management computing system 600 comprises communication interface 601, user interface 602, and processing system 603. Processing system 603 is linked to communication interface 601 and user interface 602. Processing system 603 includes processing circuitry 605 and memory device 606 that stores software 607. Management computing system 600 may include other well-known components such as a battery and enclosure that are not shown for clarity. Management computing system 600 may comprise one or more server computing systems, desktop computing systems, laptop computing systems, distributed processing devices, or any other computing system, including combinations thereof. The management computing system 600 may be a cloud infrastructure or a cloud node, wherein a software layer permits the underlying physical hardware associated with clouds, which can include servers, memory, storage, and network resources, to be viewed as virtualized units or virtual machines (VMs). These virtualized units represent some fraction of the underlying computing hardware or resources supported by the cloud infrastructure. It is understood that the software 607 may be deployed seamlessly on a plurality of clouds.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In particular, communication interface 601 is configured to communicate with cache nodes of the content delivery network to configure the cache nodes with HTTP acceleration services and applications.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus (e.g. script repository 216). Processing circuitry 605 is typically mounted on a circuit board that may also hold memory device 606 and portions of communication interface 601 and user interface 602. Software 607 comprises computer programs, firmware, or some other form of machine-readable processing instructions. Software 607 includes crawler module 608, extractor module 609, and script modeler module 610, comparison module 612, recursion module 614, although any number of software modules may provide the same operation. Software 607 may further include an operating system, utilities, drivers, network interfaces, applications, or some other type of software. When executed by processing circuitry 605, software 607 directs processing system 603 to operate management computing system 600 as described herein.

In at least one implementation, crawler module 608 directs processing system 603 to crawl through a repository of web content in search of web applications 105 with script content. In response to gathering the web applications 105, which may be provided: locally via a user interface on the management system 150; scoured through internet; or may be provided from a console device associated with the administrator that developed the web applications (e.g. service or content provider 110), the extractor module 609 parses the application into structural features or nodes. Once converted, script modeler module 610 builds a plurality of ASTs for each script extracted. The script modeler module 610 clusters the plurality of ASTs into common clusters by means a predetermined tree edit distance. If within that predetermined tree edit distance, then the tree is clustered with like trees. Once assembled into clusters, an entire cluster (e.g. set) is generalized into a generalized AST. The GAST has nodes that predictive of the type of script (e.g. banking, retailer, email, auction, etc.). The modeler module 610 assigns a type to the GAST based on the common nodes (e.g. password for type of login scripts).

A client device 114 that includes and/or makes use of an end user web browser 112, which may further include a script de-obfuscator. In at least some embodiments, the de-obfuscator may de-obfuscate and/or unfold script code. Once the modeler module 610 has completed, the management system 150 can develop a policy 103. The end user device 114 can receive the client-based malware policy 103 embedded with the requested unclassified web application 105 from at least one of the management system 150 and the server 110. The policy 103 may call to the extractor or parser module 609 to extract the unclassified script structural features and the modeler module 610 to model the structural features into an AST. It is foreseen that the web browser 112 may already include a parser, and in this case the module 609 may be unnecessary. The policy 103 calls to the comparison module 612 to inspect code (e.g., script) received by the client web browser 112. For example, the comparison module 612 can compare the unclassified end user web browser script with the generalized scripts in the script repository 216 to determine if the code is malicious or benign. Once determined to be benign, in at least some embodiments, the script engine of the web browser 112 is configured to load, compile, and/or run script code that is retrieved by the web browser 112, e.g., as part of a web page that is navigated to via the web browser. If the script is determined to be malicious, a notification may be sent to the server 110 and the script may not be allowed to run. Once there is a determination, there exists a possibility that the determination is false.

The recursion module 614 is instantized once a misclassification has occurred. The server 110, once notification is received, may allow the web application to run, therein creating an exception to the policy 103 as a script was misclassified. Instead of or in combination with allocating for an exception, the management system 150 will review the false positive, and in particular the tree edit distance. It is foreseen that other algorithms may be used to compare to the first algorithm used to get to a result that does not tend towards a false positive. Once the training or machine learning is accomplished the updated generalized AST replaces previous GAST to minimize miscalculations.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the disclosure is not limited to the specific implementations described above, but only by the claims and their equivalents.

What is claimed is:

1. A method of detection and protection from script-based attacks comprising:
   automatically determining a plurality of generalized abstract structures by:
   executing an extractor module to extract a plurality of scripts from a plurality of benign web content and parse script code of the scripts to extract structural features of the scripts; and executing a script modeler module to build a plurality of abstract structures using the structural features of the scripts, cluster individual ones of the plurality of abstract structures into common clusters of the abstract structures based on a predetermined tree edit distance, and model a generalized abstract structure for each of the common clusters of the abstract structures to determine the plurality of generalized abstract structures;

determining a structure of an unclassified end user browser script by using automation to build an abstract structure using code from the unclassified end user browser script;

comparing the structure of the unclassified end user browser script with the plurality of generalized abstract structures to determine if the structure of the unclassified end user browser script matches one or more of the plurality of generalized abstract structures; and if the structure of the unclassified end user browser script matches one or more of the plurality of generalized abstract structures then classifying the unclassified end user browser script as benign, otherwise classifying the unclassified end user browser script as malicious.

2. The method of claim 1, wherein the abstract structure is at least one of: an abstract syntax tree, a parser tree, and a concrete syntax tree.

3. The method of claim 1 wherein the predetermined tree edit distance comprises a value for a threshold of comparison of one tree to another.

4. The method of claim 1 wherein the plurality of generalized abstract structures comprises generalized abstract syntax trees.

5. The method of claim 1 wherein the plurality of generalized abstract structures are generalized by associating common nodes that are predictive of particular types of scripts.

6. The method of claim 1 wherein the unclassified end user browser script comprises JavaScript.

7. The method of claim 1 wherein the unclassified end user browser script comprises a portion of a script code.

8. One or more non-transitory computer-readable storage media having program instructions stored thereon, wherein the program instructions, when executed by a computing system, direct the computing system to at least:

automatically determine a plurality of generalized abstract structures by:
executing an extractor module to extract a plurality of scripts from a plurality of benign web content and parse script code of the scripts to extract structural features of the scripts; and
executing a script modeler module to build a plurality of abstract structures using the structural features of the scripts, cluster individual ones of the plurality of abstract structures into common clusters of the abstract structures based on a predetermined tree edit distance, and model a generalized abstract structure for each of the common clusters of the abstract structures to determine the plurality of generalized abstract structures;

determine a structure of an unclassified end user browser script by using automation to build an abstract structure using code from the unclassified end user browser script;

compare the structure of the unclassified end user browser script with the plurality of generalized abstract structures to determine if the structure of the unclassified end user browser script matches one or more of the plurality of generalized abstract structures; and if the structure of the unclassified end user browser script matches one or more of the plurality of generalized abstract structures then classify the unclassified end user browser script as benign, otherwise classify the unclassified end user browser script as malicious.

9. The one or more non-transitory computer-readable storage media of claim 8 wherein the abstract structure is at least one of: an abstract syntax tree, a parser tree, and a concrete syntax tree.

10. The one or more non-transitory computer-readable storage media of claim 8 wherein the predetermined tree edit distance comprises a value for a threshold of comparison of one tree to another.

11. The one or more non-transitory computer-readable storage media of claim 8 wherein the plurality of generalized abstract structures comprises generalized abstract syntax trees.

12. The one or more non-transitory computer-readable storage media of claim 8 wherein the plurality of generalized abstract structures are generalized by associating common nodes that are predictive of particular types of scripts.

13. The one or more non-transitory computer-readable storage media of claim 8 wherein the unclassified end user browser script comprises JavaScript.

14. The one or more non-transitory computer-readable storage media of claim 8 wherein the unclassified end user browser script comprises a portion of a script code.

15. An apparatus comprising:
one or more non-transitory computer-readable storage media;
a processing system operatively coupled with the one or more non-transitory computer-readable storage media; and
program instructions stored on the one or more non-transitory computer-readable storage media that, when executed by the processing system, direct the processing system to at least:
automatically determine a plurality of generalized abstract structures by:
executing an extractor module to extract a plurality of scripts from a plurality of benign web content and parse script code of the scripts to extract structural features of the scripts; and
executing a script modeler module to build a plurality of abstract structures using the structural features of the scripts, cluster individual ones of the plurality of abstract structures into common clusters of the abstract structures based on a predetermined tree edit distance, and model a generalized abstract structure for each of the common clusters of the abstract structures to determine the plurality of generalized abstract structures;

determine a structure of an unclassified end user browser script by using automation to build an abstract structure using code from the unclassified end user browser script;

compare the structure of the unclassified end user browser script with the plurality of generalized abstract structures to determine if the structure of the unclassified end user browser script matches one or more of the plurality of generalized abstract structures; and if the structure of the unclassified end user browser script matches one or more of the plurality of generalized abstract structures then classify the unclassified end user browser script as benign, otherwise classify the unclassified end user browser script as malicious.

16. The apparatus of claim 15 wherein the abstract structure is at least one of: an abstract syntax tree, a parser tree, and a concrete syntax tree.

17. The apparatus of claim 15 wherein the predetermined tree edit distance comprises a value for a threshold of comparison of one tree to another.

18. The apparatus of claim 15 wherein the plurality of generalized abstract structures comprises generalized abstract syntax trees.

19. The apparatus of claim 15 wherein the plurality of generalized abstract structures are generalized by associating common nodes that are predictive of particular types of scripts.

20. The apparatus of claim 15 wherein the unclassified end user browser script comprises JavaScript.

\* \* \* \* \*